July 31, 1956 B. P. BOGERT 2,757,345

IMPEDANCE INVERTERS

Filed Sept. 16, 1953

INVENTOR
B. P. BOGERT
BY Harry C. Hart
ATTORNEY

United States Patent Office 2,757,345

Patented July 31, 1956

2,757,345

IMPEDANCE INVERTERS

Bruce P. Bogert, Morristown, N. J., assignor to Bell Telephone Laboratories, Incorporated, New York, N. Y., a corporation of New York Application September 16, 1953, Serial No. 380,542

14 Claims. (Cl. 333—80)

This invention relates to impedance inverters and has for its object the simplification of electric circuits whose function is to generate the inverse of a specified impedance.

Situations arise in the communications arts in which it is required to perform the operation of reciprocation with respect to an impedance element. To take but a single example, it may be required to provide a large inductance in a small space. Without resort to an inverter such a large inductance normally requires many turns of wire on a ferromagnetic core of substantial size and weight; i. e., a size and weight which are incompatible with the space requirements. By the use of an inverter, however, the impedance of a small condenser may be caused to appear equal to that of a large inductance. The combination of the condenser and the inverter then constitutes a large effective inductance which may be enclosed within a small space.

A familiar example of the impedance inverter is a quarter wavelength transmission line or a combination of lumped reactive elements which simulate it. Such an impedance inverter has been employed in many different connections, notably in the high efficiency amplifier of Doherty Patent 2,210,028. It carries with it, however, the restriction that it is essentially a narrow band device. The availability of a satisfactory impedance inverter not subject to the narrow band restriction would greatly enlarge the possibilities of the Doherty amplifier.

The present invention is based on the discovery that by the proportioning of the gain or transconductance and of the input and output self-impedances of a feedback amplifier in relation to its load and to the impedance of its feedback path, satisfactory impedance inversion may be secured over a limited but useful impedance range and over a wide frequency range. The particular proportions of the circuit parameters which achieve this result depend on the type of feedback amplifier employed. For example, in the case of a high gain amplifier in which the feedback path is connected in parallel with the output terminals and also in parallel with the input terminals, it turns out that the requirements are satisfied when, among the controlling circuit parameters, namely, input impedance, output impedance, feedback resistance, and load impedance, each of these quantities has a value substantially smaller than the one which immediately precedes it in the list. A common vacuum tube of the triode or tetrode variety, operated with its control grid biased negatively, is a specific example of such an amplifier.

It may, on the other hand, be preferred to employ a low gain amplifier having a feedback path connected in parallel with its output terminals and in series with its input terminals and having no substantial amount of resistance in its feedback path. With this configuration it turns out that the requirements are met when the input impedance is moderately high, the output impedance is very low, the load impedance has an intermediate value, and the amplifier gain is somewhat in excess of unity. Amplifiers meeting these requirements are readily available and may have any one of many different physical forms.

The invention will be fully apprehended from the following detailed description of preferred embodiments thereof taken in connection with the appended drawing, in which.

Figures 1, 2, 3, 4, 5, 6, 7, 8, 9, 10:
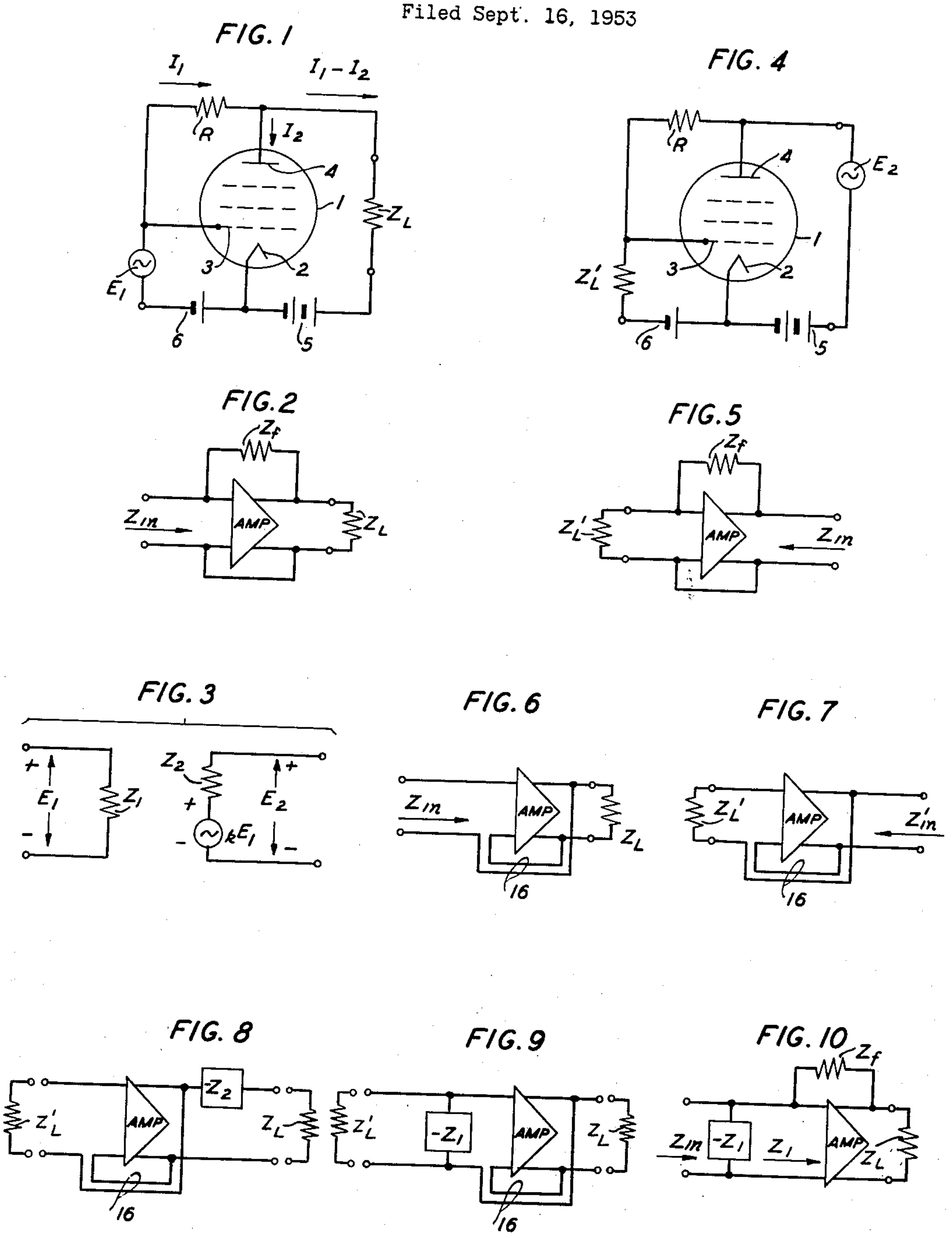
Fig. 1 is a schematic circuit diagram showing an impedance inverter in accordance with the invention in one of its forms.
Fig. 2 is a block schematic diagram showing a feedback amplifier of a general class of which the circuit of Fig. 1 is an example.
Fig. 3 is explanatory of the features of the amplifiers of Figs. 1 and 2.
Fig. 4 is a schematic circuit diagram of an impedance inverter of a form alternative to that of Fig. 1.
Fig. 5 is a block schematic diagram showing a generalization of the circuit of Fig. 4.
Fig. 6 is a block schematic diagram showing a feedback amplifier of a different class employed as an impedance inverter in one way.
Fig. 7 shows the employment of the feedback amplifier of Fig. 6 as an impedance inverter in another way.
Figs. 8 and 9 are block schematic diagrams showing the compensation of residual impedances of the circuits of Figs. 6 and 7 by negative impedances connected in series with one pair of terminals and in shunt with the other pair of terminals, respectively.
Fig. 10 is a block schematic diagram showing the addition of a compensating negative impedance element to the inverter of Fig. 2.

Referring now to the drawings, Fig. 1 shows a high-$\mu$ vacuum tube 1 having a cathode 2, a control grid 3, and an anode 4. It is connected in the so-called grounded cathode configuration in which the control grid 3 serves as one terminal of an input circuit and the anode 4 serves as one terminal of an output circuit, the cathode connection being common to the input circuit and to the output circuit. The customary positive bias is applied to the anode 4 by way of a battery 5 and the customary negative bias is applied to the control grid 3 by another battery 6. An input voltage signal source $E_1$ is connected to the input terminals, i. e., between the control grid 3 and the cathode 2, and a load $Z_L$ is connected to the output terminals, i. e., between the anode 4 and the cathode 2.

In addition to the foregoing connections, which are conventional, a resistor R is connected between the anode 4 and the control grid 3.

For the purposes of the invention the tube 1 employed is one whose anode resistance $r_p$ is moderately high, e. g., of the order of 10,000 ohms, and its grid-cathode impedance is of the order of a megohm or more. Such values are obtainable with triode vacuum tubes and are common in pentodes. Indeed, a pentode as shown is recommended, although for the sake of clarity of the drawing and simplicity of explanation the D. C. connections of its auxiliary electrodes, which do not take part in the signal frequency operation, have been omitted.

In accordance with the present invention, the magnitude of the load impedance $Z_L$ is held to a moderate value, e. g., of the order of 1000–5000 ohms, while the magnitude of the feedback resistor R is intermediate between the plate resistance $r_p$ of the tube 1 and the resistance of the load $Z_L$. When the circuit is proportioned in this fashion, the input impedance of the circuit as a whole, i. e., the impedance $Z_{in}$ seen by the source $E_1$ is inversely proportional to the load, the constant of proportionality being equal to the quotient of the feedback resistance R by the transconductance $g_m$ of the tube; i. e., $$Z_{in}=\frac{R}{g_m Z_L}$$

Thus, the circuit operates to perform an inversion of the impedance $Z_L$.

The mode in which the circuit operates to produce this result is best seen from the following circuit analysis which follows standard analytical procedures, and wherein the symbols have their conventional meanings:

$$\mu E_1 = -Z_L I_1 + (r_p + Z_L) I_2 \qquad (1)$$

$$E_1 = (R + Z_L) I_1 - Z_L I_2 \qquad (2)$$

From (2), $$I_2 = \frac{(R + Z_L) I_1 - E_1}{Z_L} \qquad (3)$$

From (1) and (3)

$$\mu E_1 = -Z_L I_1 + \frac{r_p + Z_L}{Z_L}[(R + Z_L) I_1 - E_1] \qquad (4)$$

Collecting terms and dividing by $I_1$, $$\frac{E_1}{I_1}\left[\mu + \frac{r_p + Z_L}{Z_L}\right] = -Z_L + \frac{(r_p + Z_L)(R + Z_L)}{Z_L}$$

or $$\frac{E_1}{I_1} = Z_{in} = \frac{-Z_L^2 + r_p R + r_p Z_L + Z_L R + Z_L^2}{(\mu + 1) Z_L + r_p}$$

$$Z_{in} = \frac{R + Z_L + \frac{Z_L R}{r_p}}{\left(g_m + \frac{1}{r_p}\right) Z_L + 1} \qquad (5)$$

where $$g_m = \frac{\mu}{r_p} \qquad (6)$$

Now if $$r_p >> R \qquad (7)$$

$$gm >> \frac{1}{r_p} \qquad (7a)$$

Equation 5 reduces to $$Z_{in} \doteq \frac{R + Z_L}{1 + g_m Z_L} \qquad (8)$$

If, further, $$R >> Z_L \qquad (9)$$

$$g_m Z_L >> 1 \qquad (9a)$$

Equation 8 reduces to $$Z_{in} \doteq \frac{R}{g_m Z_L} \qquad (10)$$

which is the desired result.

The disregard of grid current in Equations 1 and 2 is tantamount to the assumption that the grid-cathode impedance $Z_{kg}$ of the tube is high compared with the impedance $Z_{in}$ of Equation 10. This assumption, together with the conditions (7), (9), and (9*a*) may be restated, in the light of the definition (6), as follows:

$$\left.\begin{array}{l} r_p >> R >> Z_L \\ g_m Z_L >> 1 \\ Z_{kg} >> Z_{in} \end{array}\right\} \qquad (11)$$

With an ordinary negative-grid pentode, the grid-cathode impedance is much larger than any of the other impedances of interest. Therefore sufficient, though not necessary, conditions are:

$$\left.\begin{array}{l} Z_{kg} >> r_p >> R >> Z_L \\ g_m Z_L >> 1 \end{array}\right\} \qquad (12)$$

All of these conditions are easily satisfied with a voltage amplifier tube for which $g_m$=5000 micromhos
$r_p$=½ megohm
$Z_{kg}$=5 megohms in combination with a load of 1000–5000 ohms and a feedback resistor of 10,000–50,000 ohms.

It is easily seen that the feedback path which contains as its only impedance element the resistor R is connected in parallel with the output terminals of the amplifier tube 1 at one end and with the input terminals of the amplifier tube at its other end. Thus, the circuit falls into the class represented in block schematic form by Fig. 2, provided that the amplifier represented by the triangular box be one whose input impedance is higher than its output impedance, the output impedance in turn being larger than either the impedance $Z_f$ of the feedback path or that of the load. Referring to Fig. 3, which is the equivalent schematic diagram of the amplifier of Fig. 2, and wherein $Z_1$ is the amplifier input impedance, $Z_2$ the amplifier output impedance, and $k$ the open circuit gain factor, the foregoing conditions (11) may be restated more generally with respect to any circuit of the class shown in Figs. 2 and 3, as follows:

$$\left.\begin{array}{l} Z_2 >> Z_f >> Z_L \\ kZ_L >> Z_2 \\ Z_1 >> Z_{in} \end{array}\right\} \qquad (13)$$

Fig. 4 shows a circuit which is identical with the circuit of Fig. 1 with the sole exception of the fact that the signal source and the load have been interchanged with respect to the vacuum tube terminals. For this reason they are designated as $E_2$ and $Z_L'$. By a circuit analysis of the same conventional character as set forth above in Equations 1 through 5, it is easily shown that the impedance seen looking into the anode-cathode terminals is given by $$\frac{E_2}{I_2} = Z_{in}' = \frac{R + Z_L}{\left(g_m + \frac{1}{r_p}\right) Z_L + \frac{R}{r_p} + 1} \qquad (5')$$

If, now, the various circuit elements are proportioned in relation to each other in accordance with Equations 7, 7*a*, 9 and 9*a*, Equation 5′ reduces to $$Z_{in}' \doteq \frac{R}{g_m Z_L} \qquad (10')$$

It will be noted that Equation 10′ has exactly the same form as Equation 10. It follows that the circuit of Fig. 1 acts equally well as an impedance inverter from a source at its right-hand terminals to a load at its left-hand terminals as it does from left to right.

Just as Fig. 2 is an obvious generalization of Fig. 1, so Fig. 5 is a generalization of Fig. 4; and the circuit of Fig. 5, once its parameters have been adjusted in accordance with conditions (11) and (12), operates to effect an inversion of a load connected to its left-hand terminals as seen from a source connected to its right-hand terminals.

Fig. 6 is a block schematic diagram showing a feedback amplifier which differs in configuration from that of Fig. 2 in two respects: the feedback path 16 is connected in series with the input terminals of the amplifier, and the feedback path includes no substantial amount of impedance, e. g., it may be constructed simply of a pair of low resistance wires. Provided the input impedance, the output impedance, and the open circuit gain of the amplifier of Fig. 6 havhe the significance indicated in Fig. 3, it may readily be shown by conventional circuit analysis that the input impedance of this combination is given by the following expression, $$Z_{in} = \frac{Z_1 Z_2 + F Z_L}{Z_2 + Z_L} \qquad (14)$$

where $$F = Z_1(1 - k) + Z_2 \qquad (15)$$

If now the various impedances are proportioned as follows:

$$\left.\begin{array}{l} Z_L >> Z_2 \\ F=0 \end{array}\right\} \quad (16)$$

the above expression reduces to $$Z_{in} \doteq \frac{Z_1 Z_2}{Z_L} \quad (17)$$

In other words, the input impedance of the system as a whole is inversely proportional to the load impedance, the constant of proportionality being equal to the product of the input impedance and the output impedance of the amplifier proper, i. e., of the amplifier without load and without feedback.

It will be noted from Equation 15 that the second condition (16) places a restriction on the value of $k$, namely, the open circuit gain of the amplifier. It is easy, however, to secure, either by construction or by purchase, an amplifier whose open circuit gain as well as its input and output impedances have the required values. Specifically, the following values for $Z_1$, $Z_2$, and $k$ are easily securable with conventional amplifiers and provide the basis of an impedance inverter whose operation is excellent:

$$\left.\begin{array}{l} Z_1=6000 \text{ ohms} \\ Z_2=60 \text{ ohms} \\ k=1.01 \end{array}\right\} \quad (18)$$

With a load whose impedance is of the order of 600 ohms, the impedance seen at the input terminals of the combination is almost exactly inversely proportional to the load, the constant of proportionality being equal to $$Z^2=Z_1Z_2=60\times6000=360{,}000 \text{ ohms}$$

The open circuit gain of 1.01 is easily secured in various ways, for example, by the employment of a high gain amplifier in tandem with an output transformer having a step down turns ratio slightly less than the voltage gain of the amplifier. If preferred, power gain, low output impedance and voltage loss may be secured together by the use of a cathode follower output stage.

In contrast to the doubly parallel feedback circuit of Figs. 1–5, the input impedance of the amplifier of Fig. 6 should not be of an unlimited large magnitude. Especially if a power amplifier of the cathode follower configuration be employed, it may be desirable to shunt its input terminals with a positive impedance element proportioned in a fashion to satisfy the foregoing requirements.

Fig. 7 shows a circuit which is identical with that of Fig. 6 with the sole exception of the fact that the source terminals and the load terminals have been interchanged. To distinguish them from those of Fig. 6, they are designated in Fig. 7 as $Z_{in}'$ and $Z_L'$ respectively. Analysis of the circuit of Fig. 7 by the same conventional approach employed above leads to an expression for the input impedance $Z_{in}'$ seen at the right-hand terminals, which is as follows:

$$Z_{in}'=\frac{Z_2(Z_1+Z_L')}{F+Z_L'} \quad (19)$$

where $$F=Z_1(1-k)+Z_2 \quad (15)$$

as before. It is evident that in Equation 19 the left-hand side will be reciprocally related to the load impedance $Z_L'$ provided the following conditions are met:

$$\left.\begin{array}{l} Z_1 >> Z_L' \\ F=0 \end{array}\right\} \quad (20)$$

Under these conditions, Equation 19 reduces to $$Z_{in}'=\frac{Z_1Z_2}{Z_L'} \quad (21)$$

It will be noted that Equation 21 has exactly the same form as Equation 17, as might have been expected from the symmetry of the numerator in Equation 17. It will also be noted that the second of the conditions (20) is identical with the second of the conditions (16) and that the first of the conditions (20) is comparable with the first of the conditions (16) in a sense such that each of these conditions is completely compatible with the other. Thus, the conditions (16) and (20) may be satisfied simultaneously and together provided only that $$\left.\begin{array}{l} Z_1 >> Z_L >> Z_2 \\ F=0 \end{array}\right\} \quad (22)$$

where the prime has been dropped because $Z_L$ now stands for a load connected either to the right-hand terminals or to the left-hand terminals.

As above stated, it is easily possible to procure amplifiers and amplifier circuits in which any single parameter or element is large compared with any other one. This having been done, in the interests of simplicity, various terms were dropped in the foregoing algebraic analyses when they were small in comparison with other terms retained. The analysis thus indicates mathematical perfection of the reciprocal relation which it is beyond the power of any physical circuit to secure. Rather, the effects of the terms neglected in the analysis reappear in the circuit as miscellaneous small finite positive impedance terms which are generally tolerable although undesirable. When in any particular case it becomes important that the reciprocating action of the circuit shall be as exact as possible, it is to the same extent desirable that these residual impedance terms be compensated. In accordance with a further feature of the invention any such residual impedance term is readily compensated by employment of an equal and opposite negative resistance element in combination with the inverter. For example, with the specific inverter described above in connection with Figs. 6 and 7, the residual positive impedance which appears only in the circuit of the right-hand terminals, has the value of 60 ohms. It is readily possible to reduce this spurious term virtually to zero by conjoining with the inverter a negative resistance of magnitude −60 ohms. Such an element, shown combined with this inverter in Fig. 8, may be connected in series with the right-hand terminals.

Most negative resistance elements involve amplifiers, batteries, or both, as component parts and under such circumstances it may be desirable that at least one terminal of the negative resistance element be connected to ground. With the circuit of Fig. 8, this may be impossible. However, and by virtue of the inverting properties of the circuits of Figs. 6 and 7, a suitable negative resistance element may equally well be connected in shunt with the input terminals as shown in Fig. 9.

As shown above, the inverting constant of the system of Fig. 6 is $$Z^2=Z_1Z_2$$

Thus, the proper value for a shunt element across the left-hand terminals, which shall accomplish the same compensation as does the negative impedance $-Z_2$ of Fig. 8, is $$\frac{Z_1Z_2}{-Z_2}=-Z_1$$

Such a compensating element having this value is shown connected in shunt with the left-hand terminals of Fig. 9. Because it is connected in shunt, this element should be of the short circuit stable variety.

Compensation of residual input and output resistance terms which were neglected in the development of the inverting action of the circuits of Figs. 1–5 may be carried out in corresponding fashion. Fig. 10 shows the combination of the inverter of Fig. 2 with such a residual impedance compensator.

Within the past few years a circuit element which has been termed a "gyrator" has attracted considerable attention. It is described in detail by B. D. H. Tellegen in the Philips Research Reports for 1948 and 1949, vol. 3, pages 81 and 321, and vol. 4, pages 31 and 366. Such an element is defined as a 4-pole network of which both the input and output self-impedances are zero and one of the transfer impedances is the negative of the other.

A gyrator has the property of impedance inversion as do the circuits discussed above; and this property is to a large extent a consequence of the second part of the definition. However, in most circuit work the two transfer impedances appear only as a product. Thus, many of the important properties of a gyrator are obtained with any network which acts as an impedance inverter and whose input and output self-impedances are zero, either intrinsically or by reason of having been externally compensated or otherwise balanced out.

Thus, when with the impedance inverter of the invention there is combined a negative impedance element which is proportioned to balance out its residual self-impedances, the combination is to all intents and purposes a gyrator and may fairly be so designated and employed as such.

Still other variants and alternative embodiments of the invention which follow the broad teachings of the foregoing specification will suggest themselves to those skilled in the art.

What is claimed is:

1. In combination, an amplifier having an input terminal, an output terminal and a common terminal, a load $Z_L$ interconnecting the output terminal with the common terminal, and a feedback resistor R interconnecting the output terminal with the input terminal, said load $Z_L$ and resistor R being proportioned in relation to the input impedance $Z_1$, the output impedance $Z_2$, and the transconductance $g_m$ of the amplifier in accordance with the relations $$Z_1 >> Z_2 >> R >> Z_L$$
$$g_m Z_L >> 1$$

whereby the input impedance of said combination bears an approximately reciprocal relation to said load impedance.

2. In combination with apparatus as defined in the preceding claim, a negative impedance element of magnitude equal and opposite to the residual self-impedance of said combination connected thereto in a fashion to neutralize said residual self-impedance, whereby said approximate relation is rendered exact.

3. In combination, an amplifier having an input terminal, an output terminal and a common terminal, a load $Z_L$ interconnecting the output terminal with the common terminal, and a feedback resistor R interconnecting the output terminal with the input terminal, said load $Z_L$ and resistor R being proportioned in relation to the output impedance $Z_2$ and the transconductance $g_m$ of the amplifier in accordance with the relations $$Z_2 >> R >> Z_L$$
$$g_m Z_L >> 1$$

whereby the input impedance of said combination bears an approximately reciprocal relation to said load impedance, provided only that the input impedance $Z_1$ of the amplifier is large compared with said combination input impedance.

4. In combination, an amplifier having an input terminal, an output terminal and a common terminal, a load $Z_L$ interconnecting the output terminal with the common terminal, and a feedback resistor R interconnecting the output terminal with the input terminal, said load $Z_L$ and resistor R being proportioned in relation to the input impedance $Z_1$, the output impedance $Z_2$, and the transconductance $g_m$ of the amplifier in accordance with the relations $$Z_1 >> Z_2 >> R >> Z_L$$
$$g_m Z_L >> 1$$

and a negative impedance element of magnitude equal and opposite to the residual self-impedance of said combination, connected thereto in a fashion to neutralize said residual self-impedance, whereby the input impedance of said combination is reciprocally related to said load impedance.

5. In combination, a vacuum tube having a grid terminal, an anode terminal and a cathode terminal, a load $Z_L$ interconnecting the anode terminal with the cathode terminal, and a feedback resistor R interconnecting the anode terminal with the grid terminal, said load $Z_L$ and resistor R being proportioned in relation to the grid-cathode impedance $Z_g$, the plate resistance $r_p$ and the transconductance $g_m$ of the tube in accordance with the relations $$Z_g >> r_p >> R >> Z_L$$
$$g_m Z_L >> 1$$

whereby the input impedance of said combination as seen at the grid and cathode terminals is reciprocally related to said load impedance.

6. The combination which comprises an amplifier having input terminals, output terminals, an input impedance $Z_1$, an output impedance $Z_2$, an open circuit gain factor $k$, a load $Z_L$ interconnecting said output terminals, and a feedback path of negligible resistance connected in parallel with said output terminals and in series with said input terminals, said load being proportioned in relation to the input impedance $Z_1$, the output impedance $Z_2$, and the open circuit gain factor $k$ of the amplifier in accordance with the relations $$Z_L >> Z_2$$
$$Z_1(1-k)+Z_2=0$$

whereby the input impedance of said combination is approximately reciprocally related to said load impedance.

7. In combination with apparatus as defined in the preceding claim, a negative impedance element of magnitude equal and opposite to the residual self-impedance of said combination connected thereto in a fashion to neutralize said residual self-impedance, whereby said approximate relation is rendered exact.

8. The combination which comprises an amplifier having input terminals, output terminals, an input impedance $Z_1$, an output impedance $Z_2$, an open circuit gain factor $k$, a load $Z_L$ interconnecting said input terminals, and a feedback path of negligible resistance connected in parallel with said output terminals and in series with said input terminals, said load being proportioned in relation to the input impedance $Z_1$, the output impedance $Z_2$, and the open circuit gain factor $k$ of the amplifier in accordance with the relations $$Z_1 >> Z_L$$
$$Z_1(1-k)+Z_2=0$$

whereby the impedance of said combination seen at said output terminals is approximately reciprocally related to said load empedance.

9. In combination with apparatus as defined in the preceding claim, a negative impedance element of magnitude equal and opposite to the residual self-impedance of said combination connected thereto in a fashion to neutralize said residual self-impedance, whereby said approximate relation is rendered exact.

10. The combination which comprises an amplifier having a first pair of terminals, a second pair of terminals, an impedance $Z_1$ at said first terminals, an impedance $Z_2$ at said second terminals, an open circuit gain factor $k$ from the first terminal pair to the second terminal pair, a load $Z_L$ interconnecting one of said terminal pairs, said other terminal pair being accessible, and a feedback path of negligible resistance connected in parallel with said output terminals and in series with said input terminals, said load being proportioned in relation to the impedance $Z_1$, the impedance $Z_2$, and the open circuit gain factor $k$ of the amplifier in accordance with the relations $$Z_1 >> Z_L >> Z_2$$
$$Z_1(1-k)+Z_2=0$$

whereby the impedance of said combination seen at said accessible terminal pair is reciprocally related to said load impedance.

11. In combination with apparatus as defined in the preceding claim, a negative impedance element of magnitude equal and opposite to the residual self-impedance of said combination connected thereto in a fashion to neutralize said residual self-impedance, whereby said approximate relation is rendered exact.

12. In combination, an amplifier having input terminals characterized by an input impedance $Z_1$, output terminals characterized by an output impedance $Z_2$, said amplifier being further characterized by an open circuit gain factor $k$, a load coupled to one of said terminal pairs, said other terminals being accessible, a feedback path connected to the output terminals for supplying energy to the input terminals, said load and the properties of said feedback path being coordinated with the input impedance $Z_1$, the output impedance $Z_2$, and the open circuit gain factor $k$, in a fashion to give rise to an effective impedance seen at said accessible terminals which is expressible as the quotient of two polynomials, at least one term of at least one factor of the denominator polynomial representing the magnitude of said load impedance, said various parameters being proportioned in their relative magnitudes in a fashion to cause all numerator terms containing said load impedance to vanish approximately and all denominator terms not containing said load impedance to vanish approximately, whereby said effective impedance bears an approximate inverse relation to said load impedance, and a negative impedance element of magnitude equal and opposite to the residual self-impedance of said combination connected thereto in a fashion to neutralize said residual self-impedance, whereby said approximate relation is rendered exact.

13. In combination, an amplifier having an input terminal, an output terminal and a common terminal, a load $Z_L$ interconnecting one of said input and output terminals with the common terminal, the other of said input and output terminals being accessible, and a feedback resistor R interconnecting the output terminal with the input terminal, said load $Z_L$ and resistor R being proportioned in relation to the input impedance $Z_1$, the output impedance $Z_2$, and the transconductance $g_m$ of the amplifier in accordance with the relations $$Z_1 >> Z_2 >> Z_L$$
$$g_m Z_L >> 1$$

whereby the impedance of said combination at said accessible terminals bears an approximately reciprocal relation to said load impedance.

14. In combination, a vacuum tube having a grid terminal, an anode terminal and a cathode terminal, a load $Z_L$ interconnecting one of said grid and anode terminals with the cathode terminal, the other of said grid and anode terminals being accessible, and a feedback resistor R interconnecting the anode terminal with the grid terminal, said load $Z_L$ and resistor R being proportioned in relation to the grid-cathode impedance $Z_g$, the plate resistance $r_p$ and the transconductance $g_m$ of the tube in accordance with the relations $$Z_g >> r_p >> R >> Z_L$$
$$g_m Z_L >> 1$$

whereby the impedance of said combination as seen at said accessible terminals is reciprocally related to said load impedance.

References Cited in the file of this patent

UNITED STATES PATENTS

| | | |
|---|---|---|
| 2,197,348 | Roberts | Apr. 16, 1940 |
| 2,270,644 | Blackman | Jan. 20, 1942 |

OTHER REFERENCES

Shekel: Proceedings of the I. R. E., vol. 41, No. 8, August 1953, pp. 1014, 1015 and 1016.